No. 762,827. PATENTED JUNE 14, 1904.
C. W. LEVALLEY.
SHAFT COUPLING.
APPLICATION FILED FEB. 5, 1903.
NO MODEL. 2 SHEETS—SHEET 1.
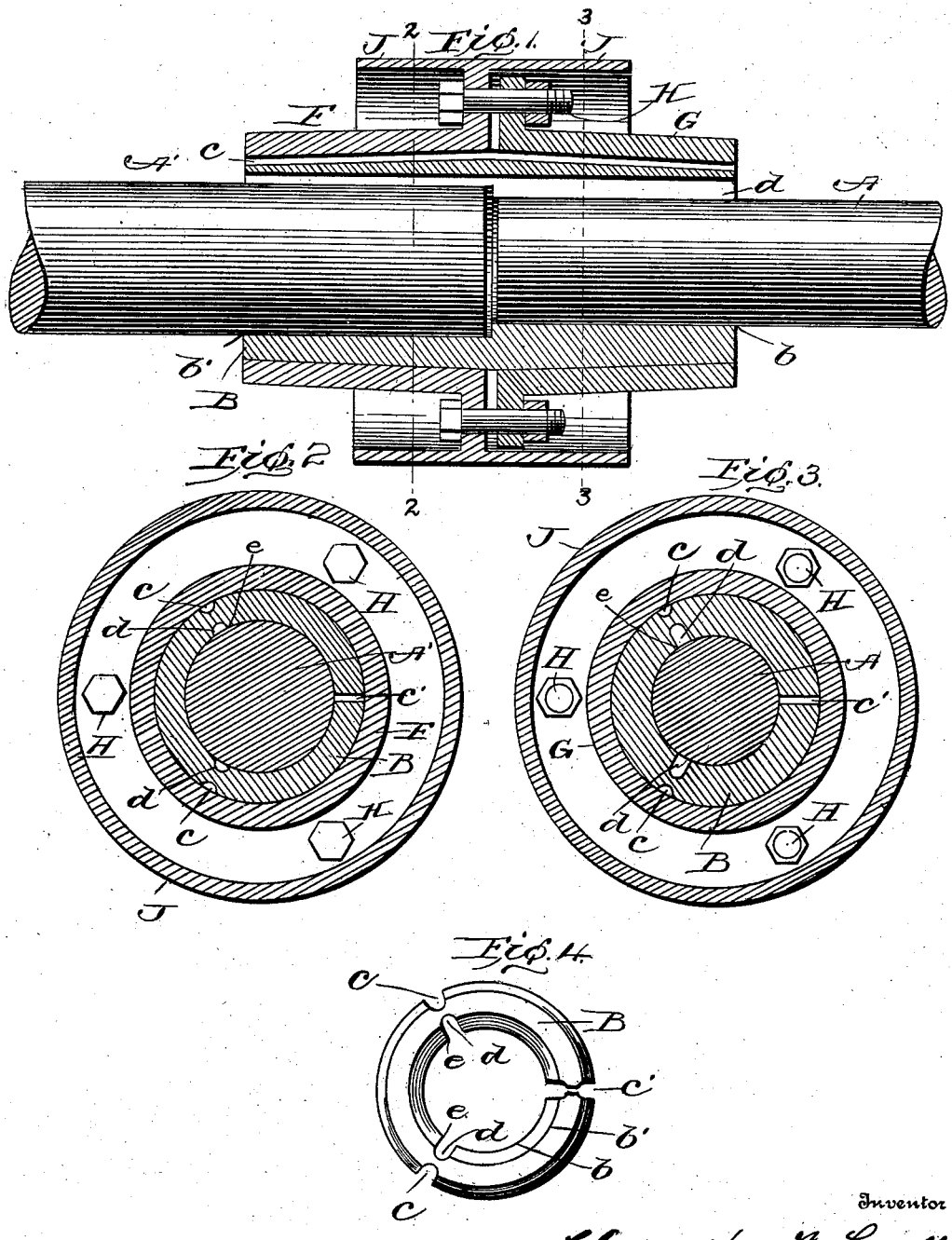

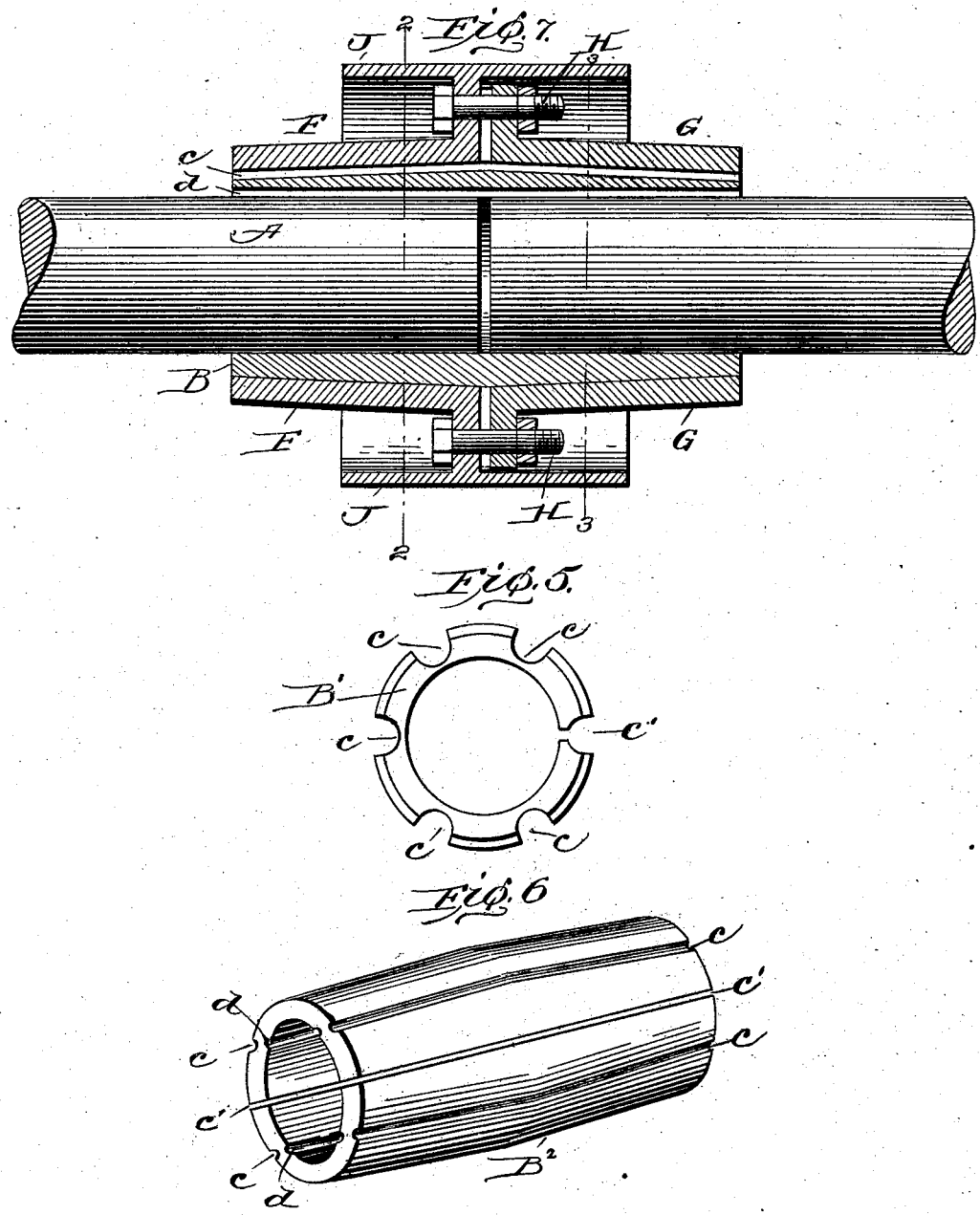

No. 762,827.

Patented June 14, 1904.

UNITED STATES PATENT OFFICE.

CHRISTOPHER W. LEVALLEY, OF MILWAUKEE, WISCONSIN.

SHAFT-COUPLING.

SPECIFICATION forming part of Letters Patent No. 762,827, dated June 14, 1904.

Application filed February 5, 1903. Serial No. 142,036. (No model.)

*To all whom it may concern:*

Be it known that I, CHRISTOPHER W. LEVALLEY, a citizen of the United States, residing at Milwaukee, in the county of Milwaukee and State of Wisconsin, have invented new and useful Improvements in Shaft-Couplings, of which the following is a specification.

My present invention relates to compression shaft-couplings of the kind in which a sleeve or coupling-piece is arranged to fit over the abutting ends of the shafts and be held thereupon by means which firmly compress it upon the shafts; and my invention has for its object to improve a coupling of this character in its general construction, to improve its capacity for gripping or holding to the shafts, and also to produce a coupling which is adapted to connect shafts of different diameters.

In the accompanying drawings, Figure 1 is a longitudinal section of a coupling embodying my improvements and constructed to couple or unite end to end two shafts of different sizes. Fig. 2 is a cross-sectional view taken on the line 2 2 of Fig. 1. Fig. 3 is a cross-sectional view taken on the line 3 3 of Fig. 1. Fig. 4 is an end view of the coupling-sleeve shown in the views already described. Fig. 5 is an end view of a coupling-sleeve of a different construction. Fig. 6 is a perspective view of a coupling-sleeve of a different construction still. Fig. 7 is a longitudinal sectional view of a device embodying my improvements arranged to unite two shafts of the same size.

In the drawings, A and A' represent two shafts to be coupled together end to end. The shafts represented in Fig. 1 are of different diameters, that designated A being the smaller.

B designates a sleeve or bushing adapted to fit over the adjacent ends of the two shafts and by being united thereto to serve as the connecting device between such shafts. It has a central aperture which is of two diameters, that at $b$ being of a size to fit the shaft A and that at $b'$ of a size to fit the shaft A'. The sleeve or bushing B tapers exteriorly from its central portion toward each end and is also preferably exteriorly grooved, as indicated at $c$, and is longitudinally severed or divided, as indicated at $c'$. The normal position of the parts of the sleeve is that indicated in Figs. 4 and 5, with the parts on the opposite sides of the separation $c'$ slightly separated. The external grooves $c$ reduce the thickness of the metal constituting the bushing wherever such grooves are formed, so that when the devices which compress the sleeve upon the shafts are applied the sleeve will yield at these weakened or reduced portions and can thus be forced into very close and intimate engagement with the shafts. The interior surface of the sleeve or bushing may be continuous, as indicated in Fig. 5; but I prefer that it should be separated into a plurality of sections by internal grooves $d$, which are preferably arranged opposite to the external grooves $c$. When the sleeve is internally grooved in this manner, there are formed along the sides of the grooves the sharp edges $e$, so that when the sleeve is compressed upon the shaft these edges tend to grip or bite into the shaft, and thus cause the sleeve to hold with great firmness, so that the danger of the coupling slipping is reduced to a minimum.

The surface portions of the coupling between the weakened parts thereof formed by the grooves whether external or internal are relatively broad—that is, relative to the width of the weakened portions. This is important in a shaft-coupling, because unless the surfaces of the sleeve that bear upon the shafts are broad and of considerable extent the shaft will not be held with sufficient firmness for practical purposes.

When the sleeve or bushing B is a reducing-coupling, as indicated in Figs. 1, 2, 3, and 4—that is, a coupling adapted to unite shafts of different diameters—I prefer that the internal grooves $d$ should be deepest through that portion of the sleeve or bushing which engages with the smaller shaft, so that the thickness of the metal opposite the internal grooves shall be uniform from end to end of the sleeve.

F and G indicate the compressing members of the coupling. They are preferably short cylinders with flanged ends adapted to receive the screw-threaded bolts H by which they are united and drawn toward each other. These coupling members are internally shaped to fit the exterior tapering surfaces of the sleeve.

It will be readily understood that by means of the bolts H the compressing parts F and G are drawn toward each other and in so doing force the sleeve into close and intimate engagement with the shafts to be united. I prefer that one of the compression members, that indicated by F in this instance, should be provided with a peripherial flange J, which may serve as a band-pulley.

In Fig. 5 I show a form of coupling-sleeve B' which is reduced by external grooves only, its internal surface being plain. It will be understood that the grooves can be more or less numerous than is indicated in the drawings, as found best suited for the different uses to which the couplings are put.

In Fig. 6 I have shown a form of bushing or sleeve B² embodying my invention, which is formed of two distinct and separate sections. These are placed over the ends of the shafts to be united and compressed upon the same by means of coupling or compression members, like those indicated at F and G.

It will be observed by referring to the drawings that the grooves in the coupling-sleeve extend longitudinally thereof from end to end and also that the compression members F and G are of a size and construction to engage with practically the entire outer surface of the coupling-sleeve and to exert their compressing force thereupon with practical uniformity at all points. These two features are important in the construction of a shaft-coupling intended to be used upon alining connected shafts subject to severe torsional strains, as by their conjoint use and coöperation it is possible to produce a compression shaft-coupling adapted to be compressed upon the shafts and to engage therewith with a practically uniform force throughout its entire extent from end to end, the sleeve being forced into engagement with the shafts at its middle portion with as great power as at its ends, a result that has not heretofore been accomplished in the use of powerful shaft-couplings.

Having described my invention, what I claim, and desire to secure by Letters Patent, is—

1. A shaft-coupling for uniting the contiguous ends of alining shafts consisting of a sleeve arranged to fit over the ends of the shafts, the sleeve being weakened longitudinally by means of grooves formed therein and extending from end to end of the sleeve, whereby it may be forced into close engagement with the shafts, the shaft-engaging portions of the sleeve disposed between the said weakened portions thereof being relatively broad, and means for compressing the said sleeve upon the shafts with practically uniform pressure throughout its entire extent from end to end, substantially as set forth.

2. A shaft-coupling for uniting the contiguous ends of alining shafts of different diameters comprising a sleeve having portions of two different internal diameters arranged to fit respectively the ends of the adjacent shafts, the sleeve being weakened along lines extending continuously from end to end thereof and the shaft bearing-surfaces between such weakened parts of the sleeve being relatively broad, and means for compressing the sleeve upon the shaft, substantially as set forth.

3. A coupling for uniting the adjacent ends of alining shafts of different diameters consisting of a sleeve having an internal diameter of different sizes to adapt it to closely fit the ends of the shafts, the sleeve being internally grooved from end to end in order to weaken it along longitudinal lines to permit it to be compressed upon the shaft ends, the bearing-surfaces between the grooves being broad relatively thereto, and the grooves through the portion of the sleeve that fits the smaller shaft being deeper than through that portion of the sleeve surrounding the larger shaft, and means for compressing the sleeve upon the shaft ends, substantially as set forth.

CHRISTOPHER W. LEVALLEY.

Witnesses:
W. C. SARGENT,
V. I. KLOFANDA.